Sept. 27, 1966    T. H. GARY    3,275,284
EXTENSIBLE AND RETRACTABLE TIE-DOWN FITTING
Filed Feb. 19, 1965    3 Sheets-Sheet 1

INVENTOR.
THOMAS H. GARY
BY
George C. Sullivan
Agent

Sept. 27, 1966  T. H. GARY  3,275,284
EXTENSIBLE AND RETRACTABLE TIE-DOWN FITTING
Filed Feb. 19, 1965  3 Sheets-Sheet 2

INVENTOR.
THOMAS H. GARY
BY
Agent

Sept. 27, 1966                T. H. GARY                3,275,284
                EXTENSIBLE AND RETRACTABLE TIE-DOWN FITTING
Filed Feb. 19, 1965                          3 Sheets-Sheet 3

INVENTOR
THOMAS H. GARY
By *George C. Sullivan*
   Agent

United States Patent Office 3,275,284
Patented Sept. 27, 1966

3,275,284
EXTENSIBLE AND RETRACTABLE TIE-DOWN
FITTING
Thomas H. Gary, Atlanta, Ga., assignor to Lockheed
Aircraft Corporation, Burbank, Calif.
Filed Feb. 19, 1965, Ser. No. 433,946
14 Claims. (Cl. 248—361)

This invention relates to anchoring or tie-down fittings, and more particularly to an extensible and retractable tie-down fitting having special utility as a releasable connector mounted on walls, floors, and other such surfaces.

The present invention contemplates an extensible and retractable tie-down fitting that may be displaced to lie substantially flush with its surrounding surface when not in use, and extended to project outwardly of such surface to provide connecting means for a member to be held thereby.

In addition, this fitting is adapted to receive remotely controlled actuating means for its displacement to and from the extended and retracted positions. This permits the use of multiple such fittings in gang arrangement all operable from a single control station either simultaneously or in predetermined sequence through appropriate interconnecting linkage.

Moreover, the instant invention is specifically adapted for quick action in the retention and release of the article or lashing secured thereby. Thus, its design and operation is such that it automatically and sequentially assumes the engaged and disengaged positions, respectively, upon extension and retraction.

The instant invention, while not limited to, finds particular utility in, cargo transporting vehicles wherein space limitations often prevent access to tie-down fittings for the release thereof prior to unloading the attached cargo or payload. Also, e.g., where such cargo comprises multiple individual pieces to be removed from the vehicle, it is desirable to dispose of the fittings as each such piece is removed, lest they interfere with and impede subsequent unloading. Equally desirable is the spontaneous operation of the several fittings when used in multiples to secure the individual pieces of cargo, as well as the sequential operation of each such fitting or group of fittings to expedite and facilitate the unloading operation.

In its broader aspects the tie-down fitting herein proposed is formed by a connecting element mounted within a wall or other surface defining structure with its outer face conforming in shape and area to the opening in which it is seated and normally disposed substantially in the plane of the surrounding surface to form a smooth and uninterrupted continuation thereof. Thus disposed, the connecting element is maintained in such position by resilient means operative on it in both the lineal and lateral directions. Additional overpowering means is provided to act in opposition to the resilient means whereby the connecting element is sequentially displaced outwardly of the associated wall and laterally into its operative position. The outer end portion of the connecting element is provided with releasable retention means to effect the cargo tie-down function.

With the above and other objects in view as will be apparent, this invention consists in the construction, combination and arrangement of parts all as hereinafter more fully described, claimed and illustrated in the accompanying drawings wherein:

Figure 1:
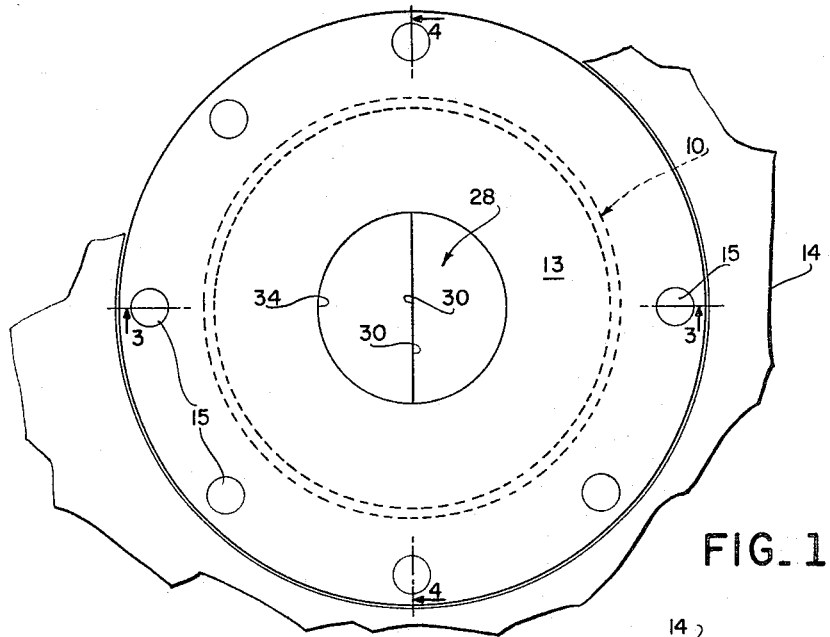
FIGURE 1 is a plan view of a tie-down fitting constructed in accordance with the teachings hereof disposed in its retracted and inoperative position.

Referring more particularly to the drawings, 10 designates a cup-like housing terminating at its open end in an internally threaded lip 11 adapted for coaction with an externally threaded collar 12 projecting laterally from a cover plate 13. The opposite or outer surface of the cover plate 13 conforms to, so as to form a smooth and uninterrupted continuation of, the external surface of an adjacent wall 14 in which the cover plate and the attached housing 10 are adapted to be mounted and immovably secured as, for example, by rivets 15.

At its inner end the collar 12 has a diameter less than the internal diameter of the housing 10 to provide an annular surface 16 laterally disposed relative to the inner surface of the housing 10. Medially of its ends the collar 12 is formed or otherwise provided with a lateral shoulder 17 extending inwardly of the housing 10 to provide a seat for one end of a compression spring 18, preferably one that is conical.

At its opposite or smaller end, the conical spring 18 seats against a guide ring 19 mounted for reciprocation in the housing 10. To this end, guide ring 19 has an overall diameter substantially equal to the inner diameter of the housing 10 whereby the peripheral surface thereof contacts the associated surface of the housing 10 on and against which it is free to slide. Centrally, the guide ring 19 is pierced by an opening 20 and is formed or otherwise provided with a concentric shoulder 21 projecting in the direction of the cover plate 13 and having an external diameter substantially equal to the internal diameter of the spring 18 to thereby retain the spring 18 in a relatively fixed lateral position. At its opposite end the guide ring 19 terminates in an inwardly projecting flange 22 adapted to contact a stop 23 provided on and extending from the inner surface of the housing 10 in spaced relation to the base or bottom wall thereof. Thus, the spring 18 serves to maintain the guide ring 19 in contact with the stop 23 and remote from the collar 12.

The shoulder 21 is formed with a pair of diametrically opposed ears 24 which extend therefrom toward the cover plate 13, each being pierced centrally by an opening for the passage therethrough of a pivot pin 25. The guide ring 19 is structurally reinforced by an appropriate number of webs or ribs 19' formed on the inner surface thereof. The pin 25 is secured in the ears 24 by a snap ring 26 at one end thereof operating in opposition to the head of the pin 25. Mounted on the pin 25 so as to be disposed between the ears 24 is a pair of levers 27 associated one with the other in scissors-like fashion with their inner ends projecting through the opening 20 in guide ring 19. Adjacent their outer ends the levers 27 abut and terminate in a surface 28 conforming in shape and area to that of the cover plate 13 being normally disposed in an opening in the cover plate 13.

Figures 2, 7:
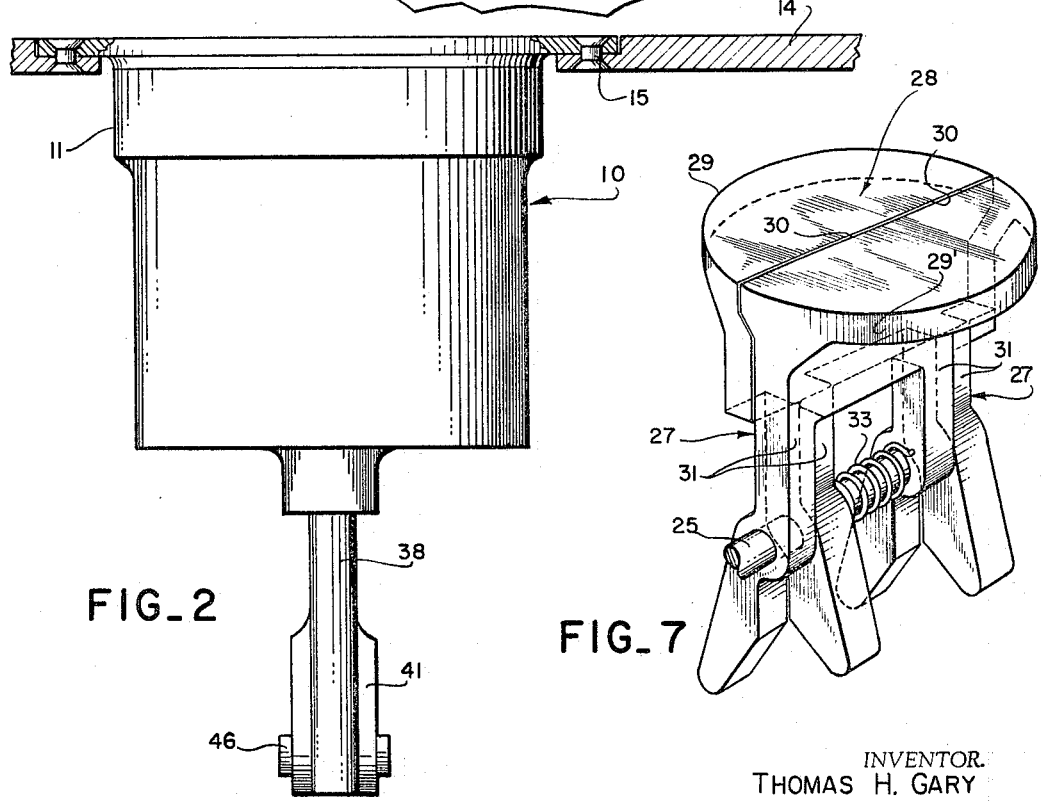
FIGURE 2 is a side view thereof showing its association with the surrounding surface of a wall or other structure in which it is adapted to be mounted.
FIGURE 7 is a perspective view of the connecting element of the tie-down fitting shown in the several FIGURES 3 through 6.
Figure 3:
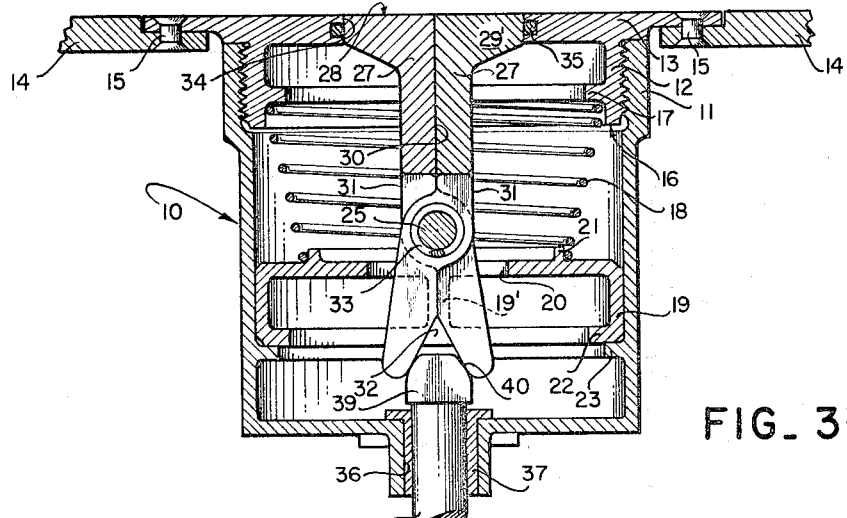
FIGURE 3 is a section taken along line 3—3 of FIGURE 1.
Figure 4:
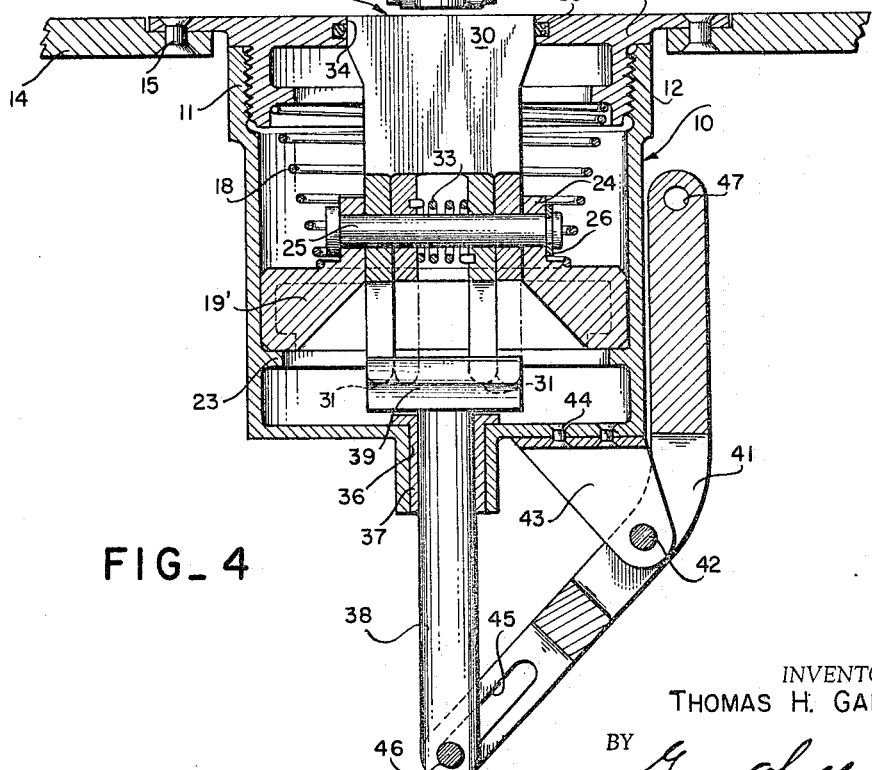
FIGURE 4 is a section taken along line 4—4 of FIGURE 1.
Figure 5:
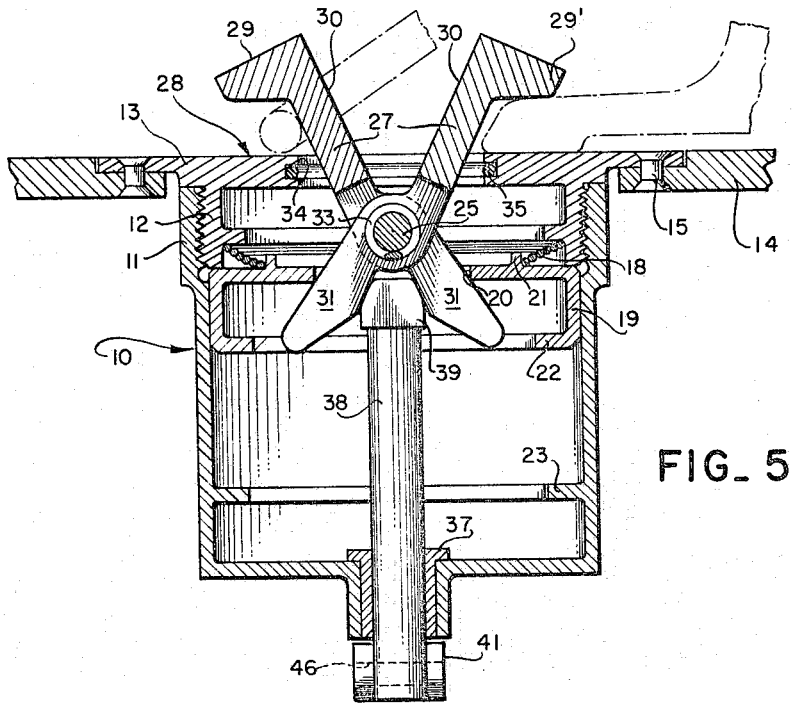
FIGURE 5 is a section similar to FIGURE 3 showing the tie-down fitting disposed in its extended and operative position.
Figure 6:
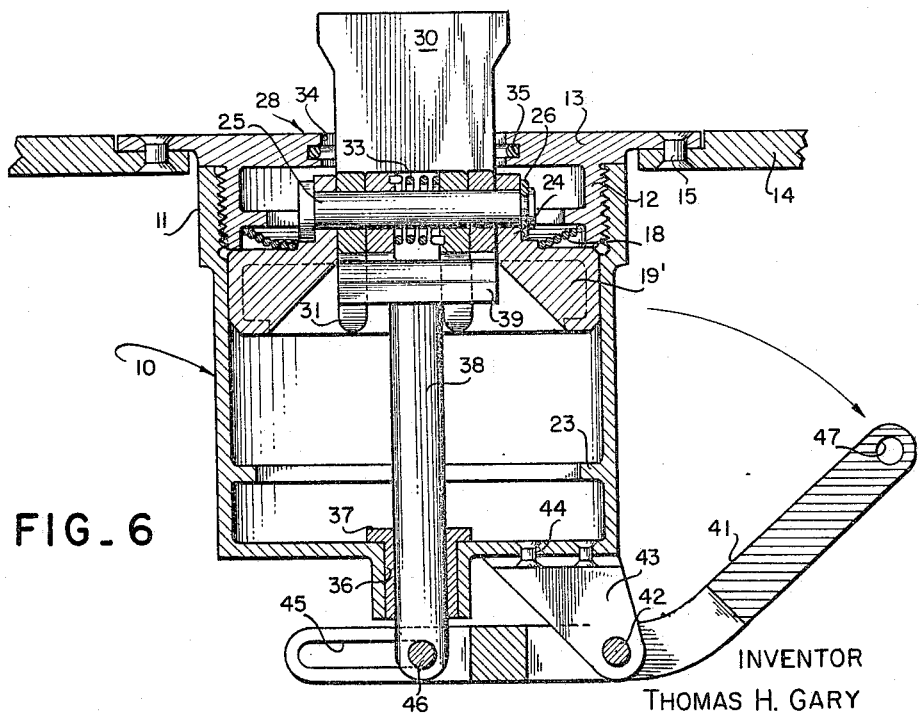
FIGURE 6 is a section similar to FIGURE 4 with the tie-down fitting in the same position shown in FIGURE 5.

More specifically, these levers 27 are identical one with the other and are mounted on the pin 25 back to back as shown in FIGURE 7. Each of the levers 27 is formed by a semicircular plate 29 defined by a flat side 30 which abuts the corresponding side 30 of the other plate 29 when mounted on the pin 25 as stated above to establish the surface 28. At its opposite side each plate 29 is formed with a lug 29' adapted to engage and retain an associated member such as a piece of cargo, a lashing or the like when the levers 27 are disposed in the extended or operative position. A pair of spaced arms 31 extend from the surface of each plate 29 opposite the surface 28 adjacent its side 30. It is the aligned openings medially of each pair of arms 31 through which the pin 25 passes. At their outer ends each pair of arms 31 is angularly disposed so that when mounted on the pin 25 they extend away from the arms 31 of the other lever 27 creating a space or gap 32 therebetween.

Mounted on the pin 25 at the center thereof so as to be disposed between adjacent arms 31 of the levers 27 is a torsion spring 33 the opposite ends of which are secured in any conventional manner to the respective levers 27. The normal action of the spring 33 maintains the flat sides 30 of the levers 27 in abutment.

When the levers 27 are assembled in the foregoing manner in the housing 10 and are located in position under the normal action of the springs 18 and 33, the outer surface 28 thus established lies in the plane of the external surface of the cover plate 13, an opening 34 of substantially equal shape and area as the plates 29 being provided in the plate 13 therefor. If desired, sealing means such as an O-ring 35 may be employed in conventional manner in the cover plate 13 defining the opening 34 to prevent dust, dirt, foreign objects and the like from entering the interior of the housing 10 while it is in the retracted and inoperative position.

The base wall of the housing 10 is pierced centrally with an opening 36 in which a bushing 37 is press fit or otherwise immovably mounted. A push-pull rod 38 is mounted for reciprocation in the bushing 37 with its head 39 disposed in the space 32 between the arms 31 of the levers 27. The head 39 is of oblong configuration so as to simultaneously engage the arms 31 of each lever 27 and terminates in a cam surface 40 adapted to coact with the adjacent surfaces of the arms 31 when a force is applied to the outer end of the rod 38. The arms 31 and sides 30 of the levers 27 are thereby separated one from the other against the action of the torsion spring 33.

In order to control this operation of the levers 27, however, the torsion spring 33 is so designed and constructed that it is substantially stronger than the conical spring 18. Therefore, the initial force applied to the rod 38 serves to move the levers 27 linearly outwardly of the housing 10 against the action of the spring 18 until such time as the guide ring 19 contacts the annular surface 16. Continued force applied through the rod 38 thereafter causes the relatively lateral movement of the levers 27, i.e., a separation thereof into the operative position.

Any means may be employed to move the rod 38 for the extension and retraction of the levers 27 in the above manner. Since the wall 14 or area defined thereby is usually of limited transverse dimension, means such as for example a bellcrank lever 41 may be provided to translate the applied force from a direction parallel to the wall 14 to a direction perpendicular thereto. This bellcrank 41 further serves as a connector for interconnecting linkage between multiple such tie-down fittings for the operation thereof in unison or in selected sequence as determined by the interconnecting linkage employed.

The bellcrank 41 is angular in shape and mounted centrally for free and unrestricted rotation on a fixed pivot 42 carried between the projecting arms of a bracket 43 secured as at 44 to the bottom of the housing 10. At one of its ends the bellcrank 41 terminates in a bifurcation having a transverse slot 45 adapted to receive a pivot or bolt 46 carried by and extending laterally of the outer end of the rod 38. At its other end the bellcrank 41 is adapted as at 47 to connect power means by which an actuating force may be applied for the rotation of the bellcrank 41 about pivot 42 whereby the rod 38 is reciprocated as described.

The foregoing construction and operation permits the rapid retention and release of members to be secured thereby. In the case of a ring or loop for example as employed at the end of a conventional lashing sequential operation of the levers 27 as described, i.e., the lineal and lateral movement thereof, effects the automatic movement of the retaining lugs 29' through the lashing ring and a separate and distinct movement thereof to the ring securing and releasing position. In other cases the lugs 29' are similarly operated to clampingly engage and disengage the flange or other projection on the member to be secured between it and the adjacent surface of the cover plate 13.

It sould be understood, however, that the above disclosure is specifically directed to a preferred embodiment of the invention. Numerous modifications or alterations may be made therein without departing from the spirit and scope of the invention as set forth in, and to be limited only by, the appended claims.

What is claimed is:

1. An extensible and retractable tie-down fitting comprising a connecting element mounted within an opening provided therefor in stationary structure with its outer face conforming in shape and area to said opening and normally disposed substantially in the plane of the exterior surface of said structure, resilient means operative on said element in distinct lineal and lateral directions to maintain said face in the normal position aforesaid, and overpowering means sequentially operative on said resilient means in opposition to said lineal and lateral directions.

2. The fitting of claim 1 including a lug carried by said element adjacent said outer face, said lug being adapted to engage and secure an associated member when said overpowering means is operated.

3. The fitting of claim 1 wherein said connecting element comprises a pair of levers each mounted medially of its length on a pivot, said levers terminating at their outer ends in normally coplanar surfaces.

4. The fitting of claim 3 wherein said overpowering means comprises an actuator associated with the other ends of said levers and operative to sequentially move said levers lineally and laterally outward relative to said structure.

5. The fitting of claim 3 wherein said levers are mounted on a common pivot for rotation in a common plane.

6. The fitting of claim 3 wherein each of said outer ends includes a lug adapted to engage and secure an associated member when said overpowering means is operated.

7. The fitting of claim 1 wherein said resilient means includes a pair of springs of preselected relative strength.

8. The fitting of claim 3 wherein said resilient means includes a relatively strong torsion spring operative between said levers and a relatively weak compression spring operative between said levers and said surrounding structure.

9. The fitting of claim 8 wherein said compression spring is conical.

10. The fitting of claim 4 wherein said actuator includes a reciprocable rod and force applying means operatively connected to said rod.

11. The fitting of claim 10 wherein said force applying means includes a bellcrank having one of its arms connected to said rod adjacent the outer end thereof and its other arm adapted to receive an actuating force.

12. The fitting of claim 3 wherein said outer face includes a plate adapted to be disposed in said opening and immovably secured thereto, said plate being pierced centrally for the passage therethrough of said levers.

13. The fitting of claim 12 including an integral collar projecting from the internal surface of said plate, and a housing secured to said collar and extending therefrom to completely enclose said levers and said resilient means.

14. The fitting of claim 13 including a seal operative between said levers and said passage therefor in said plate when the said surfaces are disposed in the coplanar position aforesaid.

References Cited by the Examiner
UNITED STATES PATENTS

| | | | |
|---|---|---|---|
| 1,281,882 | 10/1918 | Tinder et al. | 308—3 |
| 2,087,067 | 7/1937 | Nampa | 287—62 |
| 2,729,417 | 1/1956 | Maynard | 248—361 |
| 3,189,311 | 6/1965 | Hutchison | 248—361 |

CLAUDE A. LE ROY, *Primary Examiner.*

J. F. FOSS, *Assistant Examiner.*